United States Patent [19]

Hajto

[11] Patent Number: 4,735,100
[45] Date of Patent: Apr. 5, 1988

[54] FLUID FLOW SENSOR HAVING MULTIPLYING EFFECT

[75] Inventor: Ernest Hajto, Toronto, Canada

[73] Assignee: Nailor-Hart Industries Inc., Toronto, Canada

[21] Appl. No.: 868,088

[22] Filed: May 29, 1986

[51] Int. Cl.$^4$ .............................................. G01F 1/46
[52] U.S. Cl. ................................................. 73/861.66
[58] Field of Search ......................... 73/861.65, 861.66

[56] References Cited

U.S. PATENT DOCUMENTS

| | | |
|---|---|---|
| 3,751,982 | 8/1973 | Lambert . |
| 4,154,100 | 5/1979 | Harbaugh et al. . |
| 4,344,330 | 8/1982 | Renken et al. . |
| 4,425,807 | 1/1984 | Victor . |
| 4,453,419 | 6/1984 | Engelke . |
| 4,481,829 | 11/1984 | Shortridge ........................ 73/861.66 |
| 4,546,655 | 10/1985 | Victor ............................... 73/861.66 |

Primary Examiner—Herbert Goldstein
Attorney, Agent, or Firm—Rogers, Bereskin & Parr

[57] ABSTRACT

A sensor has two independent pressure chambers, each of which is in fluid communication through a plurality of relatively small passages to the flow within a duct; the passages for the first chamber being directed upstream, the passages for the second chamber being directed otherwise than upstream, usually downstream. The chambers are arranged so that their axes are parallel to each other, with the axis of the first chamber upstream of the axis of the second chamber. Depending upon the profile of the sensor, the dynamic pressure and changes therein are a constant multiplier function of the first chamber pressure minus static pressure. The constant multiplier is greater than 1.0, and is constant for a given sensor across a wide variation of measured pressures. When the profile of the sensor is essentially cruciform, with upwardly and downwardly extending wings, the multiplier effect may be in the order of 3.5 to 5.0, thereby permitting very low differential pressures to be detected and measured.

1 Claim, 1 Drawing Sheet

FLUID FLOW SENSOR HAVING MULTIPLYING EFFECT

FIELD OF THE INVENTION

This invention relates to fluid sensor devices, and particularly to fluid flow sensor devices which produce signals indicative of and proportional to the flow of fluid in a duct system. The fluid flow sensor of the present invention is particularly adapted for sensing and/or measuring dynamic or velocity pressures in duct systems such as heating and air-conditioning ducts for a building, where the pressures or changes in those pressures may be relatively low. Thus, a feature of the fluid flow sensor according to the present invention is that there is a multiplying effect by which any changes in the dynamic pressure—which changes may themselves be relatively minute—may be more easily detected and measured. This latter condition is effective because, for any given sensor when installed in a duct system, the multiplying factor is a constant over a relatively wide variation of measured pressures or changes of the dynamic pressure.

BACKGROUND OF THE INVENTION

It is well known to measure fluid flow or relative velocities of a fluid with respect to a sensor, using devices which sense pressure and/or variations of pressure of the flowing fluid. Normally, those devices are connected to gauges or other control apparatus or signal handling circuits which are or may be calibrated so as to give a reading of the parameter being sensed. That parameter is most usually velocity, but given a constant cross section of a duct system which may be a duct, pipe, shaft, conduit or tube, volumetric flow may be determined. Moreover, as will be discussed hereafter, fluid flow sensors—especially of the type disclosed by this invention—may be used for such purposes as the determination of static pressure within a duct system; and, of course, one of the principal purposes for constant monitoring of fluid flow is to sense changes in that flow so that flow control apparatus such as fans or pumps, dampers or baffles, etc., may be actuated.

Still further, it is possible in given circumstances, such as the measurement of air flowing in heating and-/or air conditioning ducts within a building, to install temperature sensing thermocouples within fluid flow sensors, for more complete control and/or monitoring of the fluid flow circumstances being sensed.

Very often, fluid flow sensors may be variations of the simple pitot tube, of the sort which may also be used for determination of air speed—that is, relative flow of a body to air, or air to the body—of aircraft and the like. Pitot-type flow meters are well known in the industry, as are other kinds of sensors such as hot wire sensors—where electrical performance characteristics of a hot wire installed within a duct may be electrically determined, by sensing variations of voltage and/or current and/or resistance as the hot wire characteristics are affected by the fluid flow. Or other devices having perforated plates or specially formed grids may be inserted within a duct, where pressure and/or volumetric measurements are made by sensing and measuring flow parameters from one side to the other of the device, and/or against the device.

Especially when measuring flow characteristics within a duct system, where the dimensions of the duct, tube, pipe or shaft may be relatively large—in excess of several inches, and up to several feet in width, height or diameter—it is important to sense fluid flow at many points across that large dimension, so as to have a more representative signal or integration of signals from which meaningful data concerning fluid flow characteristics may be derived. Thus, except in very small ducts or pipes, or in installations where careful calibration over a lengthy period of time have taken place so that measurement of fluid flow characteristics at a single point may be indicative of the fluid flow characteristics within the entire duct system, it is not usually advisable to rely upon single point sensing devices. Therefore, such devices as pitot tubes and hot wire sensors are not normally acceptable for close tolerance and meaningful data derivation of fluid flow characteristics.

The more usual condition, therefore, is to use a device which provides signals that are more closely and realistically derivative of or indicative of an average or mean fluid flow parameter being sensed, across one or a number of diagonals within a duct system at the point where the sensor or sensors is or are may be installed. However, in nearly all such cases, a calibration chart is required; and depending on the nature of the installation, consistent and repeatable data may or may not be easily obtained. For example, it is usually accepted that devices that are installed by the manufacturer into a duct system, including both the sensor and the gauge, are more consistently repeatable as to the ability to derive meaningful flow data from them. Other circumstances, where an installer may place the sensor and gauge, or where the manufacturer has placed the sensor but the installer carries a gauge, result in less predictably consistent accurate flow measurements from place to place and/or from time to time.

It is therefore one of the principal purposes of the present invention to provide a fluid flow sensor which not only will be applicable for high and low velocity fluid flow circumstances, but which will give meaningful and consistently repeatable readings for any given fluid flow conditions. A specific design of the sensing element of the fluid flow sensor of the present invention is such that there should be negligible flow pressure drop across the device, within the duct system in which it is installed, and negligible regenerative noise values that will affect fluid flow measurements.

Of course, fluid flow sensors according to the present invention are such that variations in velocity pressure across the duct system where the sensor is installed are averaged, so that signals derived from the sensor are indicative of the mean fluid flow and are therefore more representative of the actual fluid flow conditions.

The present inventor has discovered, quite unexpectedly, that if a fluid flow sensor is installed in a duct system, and has two independent pressure chambers where the first pressure chamber extends across a major dimension of the duct in a manner so as to be substantially perpendicular to the direction of flow of the fluid within the duct, and where the axes representing the mean pressure in each of the two independent chambers are parallel one to the other, with the first chamber being upstream of the second chamber, and with the first chamber being in fluid communication with the fluid flow through a plurality of small passages at the upstream side of the sensor while the second chamber is in fluid communication with the fluid flow other than at the upstream side of the sensor, then there will be a multiplying effect of the differential pressures between the dynamic or velocity pressure which is the resultant of the fluid flow, and the static pressure which is the resultant of the presence of the fluid within the duct, so that variations in the dynamic or velocity pressure may be sensitively determined because those variations may be measured as the product of the consistent multiplier and the multiplicand which is the difference between the total pressure sensed in the upstream chamber and the static pressure sensed in the downstream chamber. Of course, the consistent multiplier is a constant which is a function of the geometry of the sensor, but remains constant over a wide variation of differential pressures and within a wide variation of flow characteristics within the duct system.

Still further, the present inventor has found that when the fluid flow sensor is generally cruciform in profile, and has upwardly and downwardly directed wings which are placed between the independent pressure chambers so as to be between the fluid communication passages of those pressure chambers relative to the fluid flow, a multiplier which may be in the range of from 1.5 to 5.0 (most often in the range of about 3.5) is obtained. This permits sensitive determination of pressure flow differences, in either high velocity or low velocity fluid flow conditions, whereby the sensitivity of the fluid flow measurement may be predicted and repeatably consistent.

The prior art includes LAMBERT, U.S. Pat. No. 3,751,982, issued Aug. 14, 1973. That patent shows a device having two chambers, one of which faces upstream and one of which faces either across stream or downstream, with a plurality of openings into each chamber. LAMBERT recognizes that the difference between the total pressure and the static pressure for low volumetric rates of air flow may not be sufficient to operate a means for measuring differential fluid pressure; and he therefore states that for effective operation of that means the difference must be increased by a factor for which compensation may then be made in the means for measuring differential fluid pressure. He provides the increased difference linearly by providing sets of downstream or rearward facing openings, but he goes to great lengths to teach that the openings in the rearmost chamber may either face crosswise of the fluid flow, or rearwardly, but not both. Neither does LAMBERT provide any indication as to the magnitude of the apparent multiplier effect, which in any event is stated to be applicable only at low volumetric rates of air flow.

HARBAUGH et al, in U.S. Pat. No. 4,154,100 issued May 15, 1979, teach a pitot-type flow meter which has a downstream facing port, where considerable effort is given to the design of upstream and downstream facing surfaces so as to affect boundary layer flow characteristics; all so as to overcome the inherent difficulties of pitot-tube sensing.

RENKEN et al, in U.S. Pat. No. 4,344,330, issued Aug. 17, 1982, provide tubular members that are formed in a loop which is transverse to the fluid flow, with one of them having orifices which faces upstream and the other having orifices which face downstream. By configuring the tubes in the manner discussed, with a plurality of orifices, RENKEN et al are confident that they measure and react to average air flow conditions where the sensor is installed. RENKEN et al not only do not recognize any multiplying effect, they teach away from it, as to the derivation of signals and the way they are handled by their average fluid flow sensor.

VICTOR, in U.S. Pat. No. 4,425,807, issued Jan. 17, 1984, teaches a two chamber device having upstream facing openings to a first chamber, and pairs of openings to a second chamber which are oriented at an angle of about 110° to the upstream facing openings. By having the rear holes with that particular angle, it is said that there is a substantially consistent flow co-efficient which is independent of the conduit's Reynold's number, over a relatively wide range of useable fluid velocities. VICTOR is particularly concerned with the desire to remain relatively independent of Reynold's number for a given fluid flow situation, and is very specific as to the orientation of pairs of rear openings with respect to forward openings in the range of 105° to 115°, preferably 110°.

One other prior art patent is that issued to ENGELKE, U.S. Pat. No. 4,453,419, issued June 12, 1984. That patent relates to a commercially available product which has pairs of sensor tubes, which in certain embodiments may be mounted to an extruded holding device having blades which extend in both directions from the tubes. These blades shape the flow of air as it passes over the downstream sensing tubes, so as to permit pressure at the downstream side of the tubes to be more accurately detected. There is no discussion, however, of any multiplier affect, and if such exists it is ignored as being something which is not easily accommodated because the principal purpose of the ENGELKE invention is to create a resultant differential pressure signal which is highly representative of the actual volumetric flow rate, and is therefore directly indicative of the actual gauge pressure differences of the flow parameters.

BRIEF DESCRIPTION OF THE DRAWINGS

The present invention will be discussed hereafter, in association with the accompanying drawings, in which.

DESCRIPTION OF THE PREFERRED EMBODIMENTS

Figure 1:
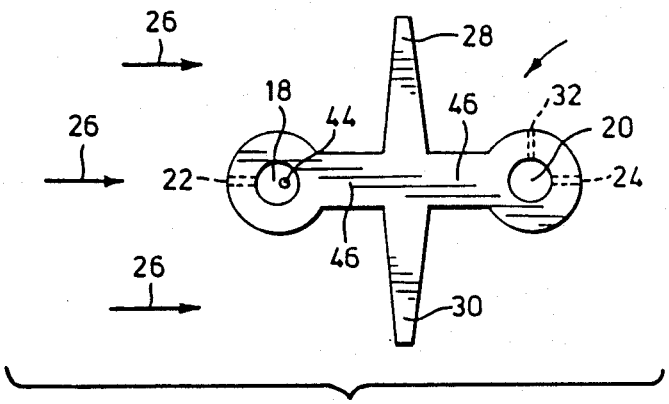
FIG. 1 is an end view of a typical profile of fluid sensor according to the present invention.

A fluid flow sensor, particularly as contemplated by the present invention, is suitable for sensing and/or measuring and/or indicating fluid flow parameters in a variety of different circumstances. For example, the fluid may be air such as flows in heating and/or air conditioning ducts within a building, or it may be gases being measured in an industrial process; or the fluid may be liquid such as water or other liquids whose fluid flow performance is desired to be measured and/or controlled. Other circumstances may include air flowing in a mine shaft for purposes of ventilation, heavy water within a nuclear reactor containment, and so on. Obviously, the only particular requirement is that the fluid, be it a liquid or a gas, is not corrosive to the duct, pipe, shaft or tube in which it is flowing, nor to the fluid flow sensors installed within that duct system.

In a usual case, such as air flow sensing within a building, it may often be desirable to install one or more sensors, depending on the size and configuration of the duct where the sensor is to be installed, and depending also on a determination as to whether the closer and/or more meaningful measurements can be made at a given point using a plurality of sensors instead of just one sensor. In any event, sensors that are made according to the preferred, cruciform, profile of the present invention may adequately serve in a single sensor per installation basis, but may be installed in plural numbers for the purposes mentioned above.

It is also true that sensors according to the present invention are usually installed for purposes of producing signals which are indicative of and proportional to the flow of fluid within a duct system, and variations of that fluid flow, but they may be used simply for measuring static pressure if that parameter is important to be known in any circumstances.

In any event, it will be understood that the present invention relates to the installation of a sensor within a duct system, where the duct may be such as an air ducting duct within a building for conducting heated and/or cooled air, an exhaust duct, an air or gas flow shaft, or any duct for ducting flow of a fluid, or any pipe for conducting the flow of the fluid, or any tube for conducting the flow of a fluid. In all cases and in all events, it is understood that the flow of the fluid is confined within the duct, pipe, shaft, tube or conduit, at least at the point where the sensor is installed.

Generally, it is contemplated that fluid flow sensors according to the present invention will be extruded, from such materials such as aluminum or polyvinyl chloride (PVC); but obviously, any suitable material may be used, depending on the purposes to which the fluid flow sensor is to be put, the nature of the fluid into which it will be inserted, its own strength so as to maintain its structural integrity under fluid flow conditions (especially if those fluid flow conditions may be severe), and with respect to the cost and expense that may be expected or desired for production of a fluid flow sensor for any particular circumstances. Moreover, especially with larger sizes, fluid flow sensors according to the present invention can be assembled from multiple pieces, including especially separate tubes and a cruciform spider structure to which those tubes may be secured.

In all events, it is the purpose of the present invention that fluid flow sensors be installed in such a manner within a duct system (be it a duct, pipe, shaft, tube or conduit) in such a manner that the best average fluid flow conditions are intercepted by the sensor and are sensed. Once again, a plurality of sensors may be required to be installed in certain circumstances. While it is appreciated that the first independent pressure chamber, as discussed hereafter, may be angled with respect to the fluid flow, it has been determined that the best results are obtained when the fluid communication passages which provide fluid communication from the fluid flow to the first independent pressure chamber face directly upstream. Still further, as discussed hereafter, the best results with the least calibration requirements upon installation and set up are obtained when the axes of both of the first and second independent pressure chambers are parallel one to the other and installed so as to be in an upstream/downstream orientation with respect to each other.

Figures 3, 4, 5:
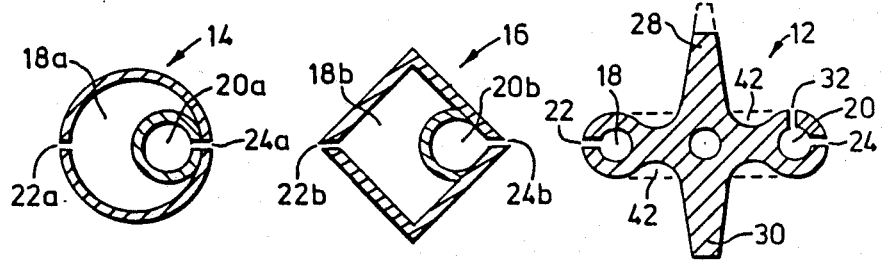
FIG. 3 is a cross section showing alternative embodiments to the sensor of FIG. 1.
FIGS. 4 and 5 are schematic cross sections of sensors exhibiting multiplying effect in keeping with a broad purpose of the present invention.

In the broadest sense, having regard to any of the profiles shown in FIGS. 1, 3, 4 and 5, the following circumstances affecting fluid flow determination of a fluid flowing within a duct system, are applicable:

Given that the fluid flow sensor 10 of FIG. 1, or 12 of FIG. 3, or 14 of FIG. 4, or 16 of FIG. 5, are all generally applicable within the broadest sense of the present invention to fluid flow sensing because they all exhibit a multiplier effect as to pressure differentials, then let it be assumed that the first independent pressure chamber 18 of each of FIGS. 1 and 3 has its equivalents in 18a in FIG. 4, and 18b in FIG. 5. Likewise, the second independent pressure chamber 20 in FIG. 1 and 3 has its equivalents 20a and 20b in FIGS. 4 and 5, respectively. It is, of course, the purpose of the fluid flow sensors to derive pressure information which is indicative of the pressure or fluid flow circumstances in the duct system where the sensor is installed. For that reason, and in keeping with the present invention, each of the first independent pressure chambers 18 (or 18a or 18b) has a plurality of relatively small passages which are in fluid communication with the fluid within the duct, at the upstream side of the sensor. Those passages are indicated at 22, (or 22a or 22b) it being understood that along the length of each sensor there are a plurality of such passages, as will be more clearly shown with respect to the discussion concerning FIG. 2. Likewise, each of the pressure chambers 20 (or 20b or 20b) has a plurality of relatively small fluid communication passages 24 (or 24a or 24b) which face downstream. [Alternative placement of the passages 24 is discussed hereafter.]

Figure 2:
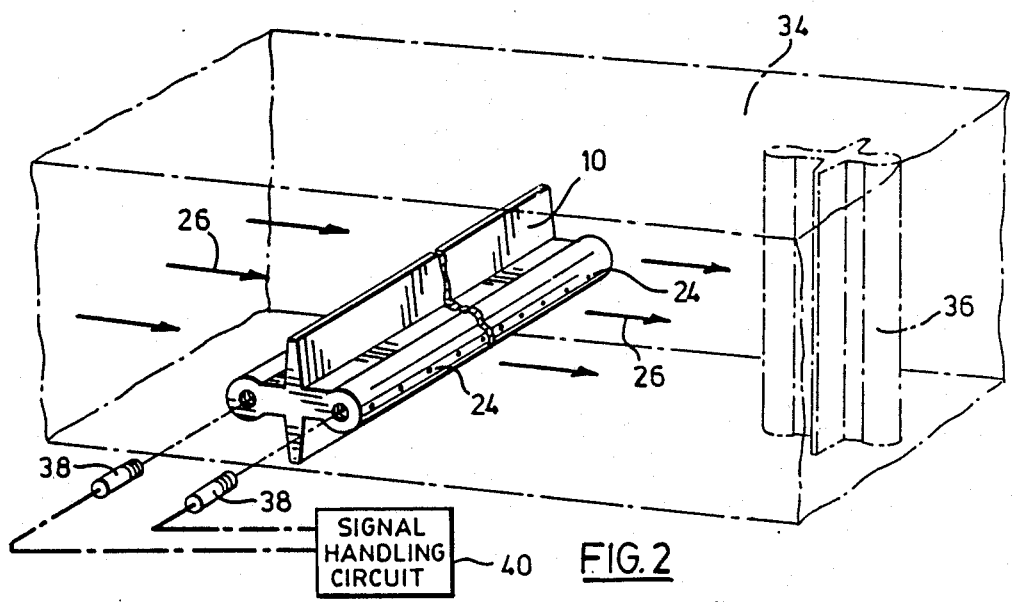
FIG. 2 is indicative, partially schematic, of a typical installation of a sensor according to the present invention.

The sense or direction of fluid flow is indicated by the arrows 26 in each of FIGS. 1 and 2.

In each case, the total pressure within the first independent pressure chamber 18 is proportional if not equal to the dynamic pressure created by the fluid flow plus the static pressure of the fluid within the duct. This is represented by equation 1 and equation 1a, below:

$$P_T = P_D + P_S \qquad \text{(Equation 1)}$$

or $$P_T \approx P_D + P_S \qquad \text{(Equation 1a)}$$

From that, it follows that the dynamic or velocity pressure is equal to or proportional to the difference between the total pressure and the static pressure, as noted in Equations 2 and 2a, below:

$$P_D = P_T - P_S \qquad \text{(Equation 2)}$$

or $$P_D \approx P_T - P_S \qquad \text{(Equation 2a)}$$

Finally, it is evident that changes in dynamic or velocity pressure will, in all events, be proportional to a constant times the difference between the total and static pressures, as shown in Equation 3, below:

$$\Delta P_D = K(P_T - P_S) \qquad \text{(Equation 3)}$$

where:
P=Dynamic or Velocity Pressure
P=Total Pressure
P=Static Pressure

Putting the above equations in words, it can be stated that when the pressure chambers are independent one of the other, and the first independent pressure chamber is in fluid communication with the fluid at the upstream side of the sensor, and the second independent pressure chamber is in fluid communication with the fluid in the duct other than at the upstream side of the sensor, and where the axes of the chambers which represent the main pressure in each of the chambers are arranged so as to be parallel one to the other, with the axes of the first chamber being upstream of the axes of the second chamber, then the following conditions apply; the pressure in the first independent chamber is proportional to the dynamic pressure created by the fluid flow plus the static pressure of the fluid within the duct, and the pressure in the second independent chamber is proportional to the static pressure of the fluid within the duct, so that the dynamic pressure is proportional to the first chamber pressure minus the static pressure. Moreover, the dynamic pressure and changes in the dynamic pressure are a constant multiplier function of the first chamber pressure minus the static pressure, where the constant multiplier is greater than 1.0. It is a fact that, over a wide variation measured pressures in the first and second independent pressure chambers, the constant multiplier is a function of the profile of the sensor, and is constant over that wide variation.

It is also a fact that, in circumstances such as those when air flow in heating and/or air conditioning ducts is being measured, the gauge pressure differential between the pressure within the first chamber 18 and the pressure within the second chamber 20 may be very low, for example in the order of 0.060 inches of water.

Having stated that the constant multiplier is a function of the profile of the sensor, it has been noted that the constant multiplier of sensors having configurations such as shown in FIG. 4 may be in the order of 1.6, and of those of FIG. 5 may be in the order of 1.8. However, it is also been noted that while the constant multiplier may be at least 1.25, and is usually in the range of 1.5 to 5.0, the constant multiplier of a sensor having the generally cruciform profile shown in FIG. 1 may be in the order of about 3.5.

Thus, the preferred embodiment of the invention is such as that which is shown in FIG. 1, being generally cruciform in nature, and having wings 28 and 30 which are upwardly directed and downwardly directed (at least in the same sense as they are shown in the figure). Given that the downstream directed passages 24 may also be directed across stream as shown at 32 in each of FIGS. 1 and 3, it holds that the upwardly and downwardly directed wings 28 and 30 are positioned at the top and bottom, respectively, of the sensor in a position which is between the passages 22 for fluid communication of the first pressure chamber 18 and the passages 24 or 32 for fluid communication of the second independent pressure chamber 20.

Referring to FIG. 2, a typical installation, and an alternative to that installation, are shown. In this case, a sensor 10 is shown to be installed within a duct whose presence is indicated at 34; and in the usual case, since the duct may be considered to be wider than it is high, the major dimension of the duct would be its horizontal dimension, and that is where the sensor is installed. In the alternative, or in any event, the sensor may be installed vertically within the duct, as shown at 36; or it may be installed diagonally, or there may be a number of sensors installed either one after another or by configuring them, so as to be at the same point with all of the upstream and all the downstream chambers communicating one with another. Pressure taps are shown at 38 to communicate the mean pressure within the chambers 18 and 20 away from the sensor 10; and that communication is thereafter shown schematically because it may be by way of gauges, transducers, or otherwise, to some form of signal handling circuits 40. Typically, those signal handling circuits 40 may be fluid pressure gauges, or they may in any event be a control means which is activated by and responsive to the dynamic pressures within the duct 34 and changes of those dynamic pressures.

Referring to FIG. 3, the height of the wings 28 and 30 of the preferred cruciform profile of the present invention may vary, so that the spread of the upwardly and downwardly extending wings may be in a ratio of from about 0.5 to about 5.0 times the upstream to downstream breadth of the sensor. That is, the overall height from the extremities of the wings 28 and 30 may be from 0.5 to 5 times the distance from the outer extremities of the passages 22 and 24, for example.

Likewise, it is preferrable that each of the independent pressure chambers 18 and 20 should be substantially equal in size one to the other, for easier purposes of calibration; and indeed, for easier purposes of installation since then it may be unimportant as to which is the first and which is the second chamber, especially if the fluid communication passages are so formed as simply to be directed upstream and downstream. However, the thickness through the horizontal arm of the profile, at each side of the wings 28 and 30, may be reduced compared to the thickness of the horizontal arm at either of the first and second independent pressure chambers 18 and 20, as shown in FIG. 1; or, it may be essentially the same thickness, as indicated at 42 in FIG. 3. Of course, for each different profile, the constant multiplier will be different, but for any sensor having the same profile and installed in the same manner within duct work through which the same fluid is flowing, the constant multiplier will be consistent from sensor to sensor. Thus, predictability and repeatability of installation can be assured, and the designer of the fluid flow system into which the sensor is installed may be more assured that his requirement for particular signal handling circuits having specific data input signal level requirements, will result in consistent performance.

Finally, in any given fluid flow circumstances, it may be possible to install a thermocouple 44 in the first independent pressure chamber 18, so that a signal may be derived from that thermocouple which is indicative of the temperature of the fluid as it impinges upon the sensor and flows into the pressure chamber 18 through the passages 22.

Obviously, given any particular fluid flow circumstances, the signal handling circuits or gauges that may be attached to the sensor may be calibrated so as to provide an indication directly of volumetric or velocity flow.

A typical fluid flow sensor which is formed of extruded aluminum or PVC, either of which may have a profile substantially as shown in FIG. 1, may be provided where the overall height of the sensor, from the extremities of the wings 28 and 30, may be in the order of 18 mm.; and the overall width, from the upstream to the downstream side, may be in the order of 22 mm. The diameter of each of the pressure chambers 18 and 20 may be in the order of 3 mm. as is the thickness of the arm 46 at each side of the wings 28 and 30. Sensors having those dimensions may be provided having lengths of from 100 to upwards of 800 mm. In general, larger sizes will be provided by extruding the wings and arms portions of the profile as a spider, and then securing tubes to each of the arms.

Obviously, variations of design and profile may be made for particular circumstances and, with experimentation, so as to provide a constant multiplier having a particular absolute value. Likewise, the above discussion has been for purposes of illustration and is not limiting to the invention, the scope of which is to be determined from the accompanying claims.

I claim:

1. A fluid flow sensor, comprising a one-piece elongate sensor element for extending across a duct, the element having: an upstream side and a downstream side; first and second independent pressure chambers which extend longitudinally of the element at said upstream and downstream sides respectively; respective series of passages for providing fluid communication between the pressure chambers and fluid at the upstream and downstream sides respectively of the element; first and second pressure taps communicating with the respective pressure chambers for permitting direct reading of pressures in said chambers; and a pair of oppositely directed wings which are co-extensive with and disposed between said pressure chambers generally normal to the intended direction of fluid flow through a duct in which the sensor is installed, said wings having parallel outer edges and being dimensioned so that the spacing between said edges is in the order of 18 millimeters.

* * * * *